United States Patent
Decker et al.

Patent Number: 4,745,560
Date of Patent: May 17, 1988

[54] METHOD OF CONTROLLING A BIT-IMAGE PRINTER

[75] Inventors: John W. Decker, Lyons, Colo.; James C. King, San Jose, Calif.; Ray A. Larner; Jeffrey B. Lotspiech, both of Boulder, Colo.

[73] Assignee: International Business Machines Corporation, Armonk, N.Y.

[21] Appl. No.: 787,297

[22] Filed: Oct. 15, 1985

[51] Int. Cl.$^4$ .................................................. G06F 15/66
[52] U.S. Cl. ...................................... 364/519; 364/518
[58] Field of Search ........................ 364/519, 518, 521

[56] References Cited

U.S. PATENT DOCUMENTS

4,627,002  12/1986  Blum et al. ........................... 364/519
4,635,212  1/1987  Hatazawa ............................. 364/519

*Primary Examiner*—Parshotam S. Lall
*Assistant Examiner*—Ellis B. Ramirez
*Attorney, Agent, or Firm*—Francis A. Sirr

[57] ABSTRACT

A bit-image printer is disclosed, having a page memory, a font memory and a font library. Fonts are selected from the library for use in composing a page image in the page memory. Loading of font characters into the page memory is controlled by the position of a cursor located within page memory. The font characters include cursor parameters which control the loading of the character into page memory, based upon current cursor position, and control movement of the cursor to a new location, in preparation for loading of the next character into page memory. After a page image is composed, the image is used to control an LED printhead which images the photoconductor of a xerographic reproduction device.

14 Claims, 4 Drawing Sheets

SQUARE

FIG. 4

ROUND

METHOD OF CONTROLLING A BIT-IMAGE PRINTER

DESCRIPTION

1. Field of the Invention

This invention relates to bit-image printing systems which first compose the entire page image in a page memory, and then print the page from this page memory. The page image may be composed from vector lines, from other images, and from characters and/or special symbols which are selected from fonts containing many of such characters and symbols.

2. Background of the Invention

The present invention advances the state of the art of bit image printing. While such printing is known in the prior art, heretofore printers of this type did not provide a friendly language interface by which an individual was able to compose a page image, nor did the printers provide the capability of composing a page image having a great variety of text, symbols, images, graphics and vectors.

The object of the present invention is to provide a friendly and primitive level language interface to the human operator, which interface simplifies the job of composing a page image. The present invention provides advanced printing functions in that many types of fonts, graphics and vectors, can be mixed within a single page. In addition, printing can take place in any one of four directions, and the page itself can be oriented in any one of four directions, thus giving sixteen possible ways in which a character can be located relative the sheet being printed. All of this is accomplished in a simple, relatively inexpensive manner.

The foregoing and other features and advantages of the invention will be apparent from the following more particular description of a preferred embodiment of the invention, as illustrated in the accompanying drawing.

THE INVENTION

The page printer of this invention is a paper sheet output device that uses a xerographic engine and a linear light emitting diode (LED) array to produce toner images on plain paper. However, the present invention is not to be restricted to this specific type of printer. By definition, a page printer is a device that composes an entire page in a page memory before beginning to print the page. In the page printer of FIG. 1, a physical sheet of paper 30 always moves with short edge 31 as its leading edge, as is shown in FIGS. 6A through 6D.

When printing a page, the page's PEL (printable points) pattern image then stored in a RAM page memory (also called a page map herein) is scanned in line-by-line fashion, and one PEL line at a time is sent to the LED printhead. This printhead spans the width of a belt photoconductor, and projects a line of dots of light onto the moving photoconductor belt in accordance with the binary content of the line of image data in the page memory. Light emitted by an energized LED discharges a corresponding PEL area of the photoconductor. Thereafter, the photoconductor moves past a toner source, whereat the photoconductor's discharged areas attract toner (for example, this is a discharged area development, or DAD, system). The photoconductor's toner image is now transferred to a sheet of paper, whereupon the toner is fused to the paper to form a permanent image.

Each page consists of almost seven million PELS. These PELS are so densely packed that high quality characters, images and graphics can be printed. Prior to printing a sheet, a page image is composed and stored in the printer's page memory. Image binary bits can be sent to the printer's page memory either directly, or they can be sent implicitly, by sending an instruction to load a specified font character from a RAM font memory, or by sending an instruction to generate a vector(s).

At any given time during the loading of page memory the active page memory location is identified by a cursor position. This cursor position is a position reference which is used for loading the next character into memory, or for beginning a vector line. A number of registers (sixteen) are provided in which cursor positions can be stored. Thus, by using these registers, the cursor can be restored to a desired page memory location, merely by specifying a particular register which contains the cursor position parameters for that desired location.

During loading of the page memory, an instruction can be sent to move the position of the cursor. When this is done, all subsequent characters are loaded into page memory based upon this new cursor position. By moving the cursor, and then setting PELS anywhere in the page memory, page images of arbitrary complexity can be composed.

Pages are printed with a resolution of 240 by 240 bits (PELS) per inch. Each individual PEL is addressable in page memory, and can be defined as a white area or a colored area (this function is called all-points or PELS addressable, or APA). As a result, each PEL can be selectively defined as a white spot (assuming the use of white paper) or can be colored by toner, usually it is colored black. A PEL is the smallest physical space on the sheet which can be separately printed.

The page map contains a memory cell (i.e. one binary bit) for each of the page's many PEL areas. If a memory cell contains a binary "1", then that sheet PEL area will be colored. The page map is arranged such that its bit memory locations at all times correspond to the way in which the physical sheet of paper moves through the printer, i.e., with the sheet's short edge 31 (FIGS. 6A through 6D) always being the leading edge. Thus, the first horizontal line of page map memory PELS to be accessed for printing corresponds to the horizontal line of image PELS which are immediately adjacent the sheet's edge 31, and the last line of page map memory PELS corresponds to the line of image PELS adjacent the sheet's trailing edge 32. As will be apparent, the manner in which character data is loaded into the page map's PEL storage area does, however, vary in accordance with the different page orientations shown in FIGS. 6A through 6D.

A two-dimensional (horizontal and vertical) cursor position parameters points to one particular bit position in the page memory. This cursor moves along a horizontal cursor line, in raster fashion, as the "white/black" images are stored in the page memory.

Figures 6A, 6B:
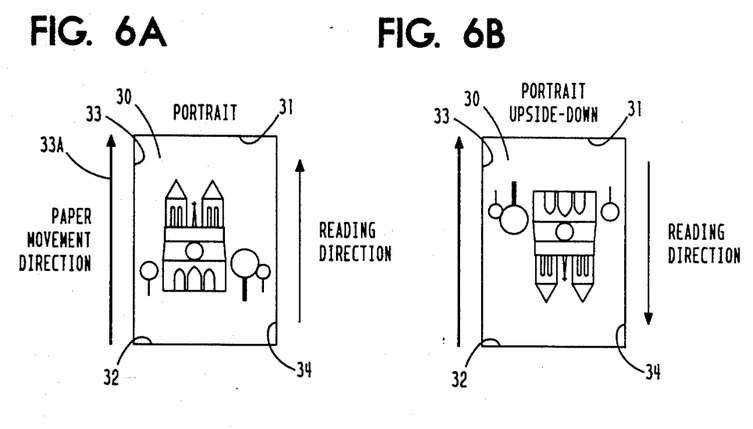
FIGS. 6A through 6D each show a sheet of paper positioned as it is while the sheet moves through the printer, each sheet having printed thereon at image which is in one of four selectable page orientations.
Figure 6C:
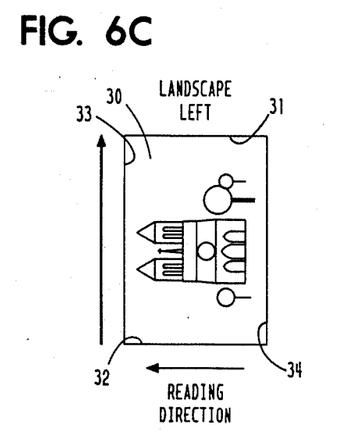
Figure 6D:
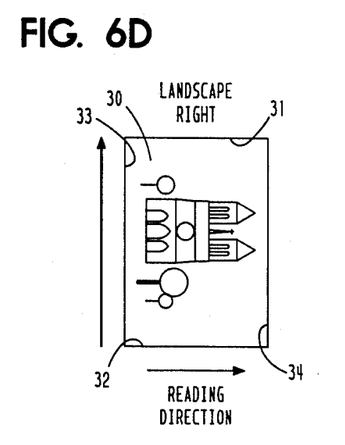

Sheets can be printed in the usual fashion, wherein the sheet's long dimension is vertical as the sheet is read (called portrait and shown in FIGS. 6A and 6B), or sheets can be printed in rotated fashion where the sheet's short dimension is vertical during reading (called landscape and shown in FIGS. 6C and 6D).

As used herein, the two terms page orientation and orientation refer to which edge of the physical sheet of paper (i.e., top, bottom, right or left edge) is the top edge of the sheet when the image on the sheet is ready by a human. The top edge 31 of physical sheet 30 (FIGS. 6A through 6D) is always the sheet's leading edge, as the sheet passes through the printer. The top edge 31 of the physical sheet 30 is not always the top edge as the image is being read, and in fact sheet top edge 31 and the image top edge are the same only for portrait orientation as shown in FIG. 6A.

Note, however, that for all orientations, the edge of the image adjacent the sheet's top edge 31 is always the first portion of the image to be printed.

FIG. 6A shows portrait orientation, i.e., normal, upright letter orientation, where the sheet's top edge 31 is on top when the image is read. FIG. 6B shows portrait upside-down orientation, where the sheet's bottom edge 32 is on top when the sheet's image is being read. FIG. 6C shows landscape left orientation, where the sheet's left edge 33 is on top when the image is being read. FIG. 6D shows landscape right orientation, where the sheet's right edge 34 is on top when the image is being read.

Figure 7A:
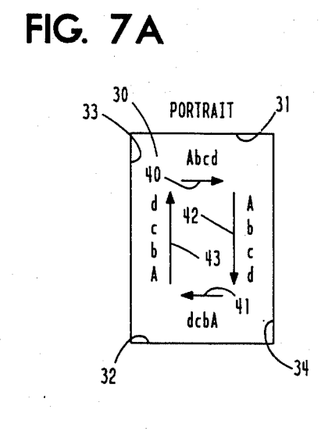
FIGS. 7A through 7D each show a sheet of paper as in FIGS. 6A through 6D, respectively, each sheet having printed thereon Latin characters which have been printed in four selectable print directions.
Figure 7B:
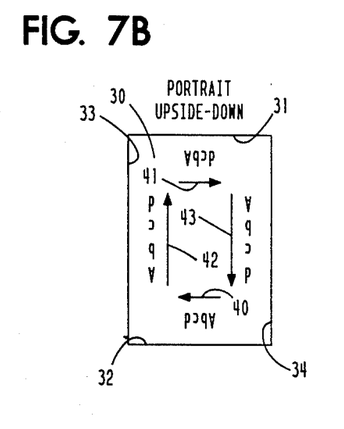

In addition to the four page orientations of FIGS. 6A through 6D, the present invention enables one to select from four different print directions, as shown in FIGS. 7A through 7B.

As used herein, the term print direction means the direction in which successive characters in a line of text are printed. Thus, in the four left to right printing directions 40 of FIGS. 7A through 7B, printing occurs from the left edge 33 of the page toward the right edge 34 of the page for each orientation, and character "A" always appears before character "b". However, the reading orientation of the characters relative sheet 30 is different for each of the figures, as shown.

Thus, for normal portrait orientation of a Latin text image on sheet 30 (FIG. 7A), the normal printing direction for the characters is direction 40, i.e., left to right on physical sheet 30. However, right to left direction 41, top to bottom direction 42, and bottom to top direction 43 can be selected in this orientation, if desired. By definition, print directions 40 and 41 are collinear, and print directions 42 and 43 are collinear.

Figure 7C:
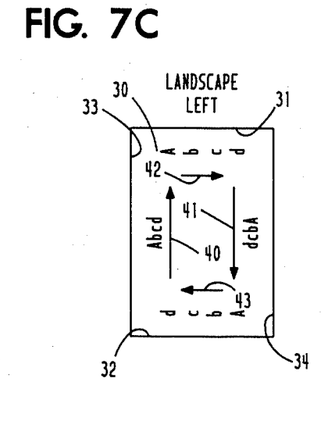
Figure 7D:
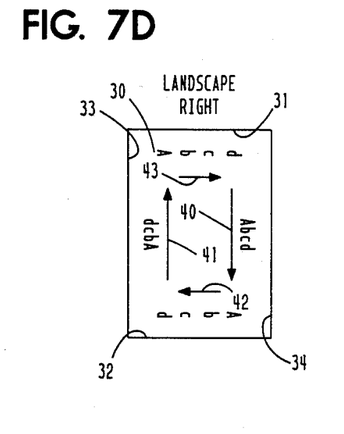

Likewise, (1) the normal print direction for these characters for portrait upside-down is right to left direction 40 of FIG. 7B; (2) the normal print direction for these characters for landscape left orientation is left to right direction 40 of FIG. 7C; and (3) the normal print direction for these characters for landscape right orientation is left to right direction 40 of FIG. 7D.

Note that when page orientation is specified, the top, bottom, left and right directions relative the image to be printed with that specified orientation have now been specified.

For example, when landscape left orientation of FIG. 6C is specified, (1) the top of the image is toward the physical sheet's left edge 33, (2) the bottom of the image is toward the sheet's right edge 34, (3) the image's right side is toward the sheet's top edge 31, and (4) the image's left side is toward the sheet's bottom edge 32.

The four possible selections of page orientation (FIGS. 6A through 6D), and the four possible selections of print direction (40, 41, 42 and 43 of FIGS. 7A through 7D) result in sixteen possible combinations of four sheet orientations and four print directions. The printer allows all combinations to be mixed in a single page image.

Examples of the use of this flexibility are apparent when it is considered that the Latin alphabet is normally read left to right in portrait fashion; Chinese or Japanese ideographic text is normally read top to bottom in portrait fashion; and Hebrew or Arabic text is normally read right to left in portrait fashion; and all of these can be printed in landscape fashion. Landscape printing is also of utility when printing spreadsheets.

The printer includes a RAM font memory which can be loaded with from eight to ten average size (256 characters) standard image fonts or special image fonts. Industry standard fonts are supplied with the printer. Special fonts (i.e., any pattern of PELS which will be used repeatedly) can be originated by the user, and can include patterns such as special symbols, bit-image graphics, vector graphics, and signatures. In this way, a page can be composed having both special font images and standard font characters.

In order to load a character from a font into page memory (see PMP command Generate Font Patterns), the font must be first loaded into the font memory (see PMP command Load Font Pattern). Since the font memory is not of unlimited capacity, and in order to avoid memory overflow, a font should be unloaded from the font memory when its characters are no longer needed (see PMP command Unload Font). Fonts may be loaded and unloaded any number of times while composing a single page.

A floppy disk drive is provided so that the user can load fonts into font memory. This disk drive is also used to load the printer's control program microcode, standard printer diagnostic programs for use by service personnel, and the disk drive also provides output disk storage space which is used to log printer status information. When the printer is first turned on, certain fonts are automatically loaded into the font memory.

Figure 2:
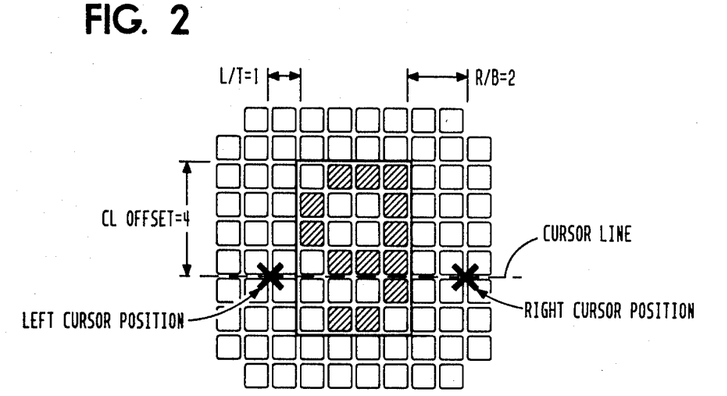
FIG. 2 shows an exemplary font character and the cursor positioning parameters associated therewith.

Each character (symbol or image) within a font has a number of parameters associated with the character, and these parameters uniquely define the character from all other characters in the font. These are (with reference to FIG. 2):

(1) PATTERN NUMBER—an assigned number which distinguishes the character from all other characters within it's font (for example, 256 characters are allowed per font).

(2) HEIGHT—the number of PELS which expresses the vertical height of the rectangular area that bounds the character's uppermost and lowermost "black" PELS (this number may be the same for all or a number of characters in the font).

(3) WIDTH—the number of PELS which expresses the horizontal width of the rectangular area that bounds the character's rightmost and leftmost "black" PELS (this number may be the same for all or a number of characters in the font).

(4) DATA—the "white/black" binary data pattern which makes up the unique character itself within its rectangular height/width area, i.e., the character's white/black shape within the rectangular memory area that is defined by its height and width numbers.

A character's data comprises a number of scan lines equal to its height number, and each scan line is equal in length to the character's width number.

(5) CURSOR LINE (CL) OFFSET—this number controls placement of the character relative the page memory's current cursor position, and relative the line being traced by the cursor.

When printing left to right or right to left (i.e., directions 40 and 41 of FIGS. 7A through 7D), this number determines the vertical distance, in PELS, between the top of the character and the horizontal line being traced by the cursor. A zero indicates that the top of the character coincides with the cursor line. A positive number indicates that the top of the character is above the cursor line, whereas a negative number indicates that the top of the character is below the cursor line.

When printing top to bottom to top (i.e., directions 42 and 43 of FIGS. 7A through 7D), this number determines the horizontal distance, in PELS, between the left edge of the character and the vertical line (on the sheet, not in memory) being traced by the cursor. A zero indicates that the left edge of the character is coincident with the vertical cursor line. A positive number indicates that the left edge of the character is to the left of the cursor line, whereas a negative number indicates that the left edge is to the right of the cursor line.

(6) LEFT TOP (L/T) SPACE—the "white" space, measured in PELS, which is reserved to the right of a character printed left to right or right to left, and reserved above a character printed top to bottom or bottom to top.

A negative value indicates that the character will overlap the preceding character, as in a heavily italicized font.

(7) RIGHT BOTTOM (R/B) SPACE—the "white" space, measured in PELS, which is reserved to the right of a character printed left to right or right to left, and above a character printed top to bottom or bottom to top.

. A negative value indicates that the character will overlap the following character, as in a heavily italicized font.

As described above, the cursor position is a reference point within the page memory. Both a vertical and a horizontal component must be specified in order to define the cursor's location at any given time. The cursor moves within memory, always pointing to the memory cells along what can be called a cursor line. In left to right printing, each character is loaded into the page memory such that the distance, in PELS, between the cursor's current position and the left edge of the character is equal to the character's L/T number. The character is aligned in the vertical direction such that it's top edge is spaced from the cursor line by the PEL distance specified by the character's CL OFFSET number. After the character is loaded into memory, the cursor is moved horizontally a PEL distance equal to the sum of the character's L/T number, the character's WIDTH number, and the character's R/T number. This new cursor position then becomes the reference point for loading the next character into page memory. From this it can be seen that the inter-character spacing between characters, expressed in PELS, is equal to the L/T and R/B numbers of adjacent characters.

The R/B, L/T and CL OFFSET numbers have one of two meanings, dependent upon the direction of printing; namely:

when the characters are to be printed horizontally (with a left-to-right, or a right-to-left, reading direction), the character's L/T number specifies the number of vertical columns of "white" PEL memory cells (all of a height as defined by the character's HEIGHT parameter) which exist between the "black" left vertical edge of this character, and this character's left-cursor position—this character is loaded into memory so that its left-cursor position is coincident with the right-cursor position of its left-adjacent character;

the R/B number specifies the number of vertical columns of "white" PEL memory cells (all of a height as defined by the character's HEIGHT parameter) which exist between the "black" right vertical edge of this character, and the right-cursor position that will be referenced during loading of the right-adjacent character;

the CL OFFSET number specifies the vertical distance, in PELS, between the top of this character's "black" pattern and the cursor line, i.e., how the character will be centered relative to the cursor line;

when the characters are to be printed vertically (with a bottom-to-top, or top-to-bottom, reading direction), the character's L/T number specifies the number of horizontal rows of "white" PEL memory cells (all of a horizontal length as defined by the character's WIDTH parameter) which exist between the "black" top horizontal edge of this character, and this character's top-cursor position—this character is loaded into memory so that its top-cursor position is coincident with the bottom-cursor position of its top-adjacent character;

the R/B number specifies the number of horizontal rows of "white" PEL memory cells (all of a horizontal length as defined by the character's WIDTH parameter) which exist between the "black" bottom horizontal edge of this character, and the bottom-cursor position that will be referenced during loading of the bottom-adjacent character;

the CL OFFSET number specifies the horizontal distance, in PELS, between the left vertical edge of this character's "black" pattern and the vertical cursor line, i.e., how the character will be centered relative the cursor line.

The subject matter of this invention includes a primitive level command interface, called page map primitive (PMP), that enables functions such as sheet size selection, print orientation selection, font selection, and the generation of vectors to create printing such as pie charts, line drawings and engineering diagrams. PMP also facilitates the merging of a number of different fonts, special symbols, and graphics in a single page. PMP is modularly arranged to allow the printer to interface with a variety of systems operating under different communication protocol, such as Asynchronous Data Mode, Binary Synchronous Communications and Synchronous Data Link Communications.

PMP is an instruction set which interprets printer control commands and image data as they are received from a using computer system, forms images on paper in accordance with the image data, and controls the xerographic process components of the printer. It is the most primitive level of functional interface which exists between the printer and the computer system that is using the printer to create paper output prints.

In the following description, the notation X'hh' is used to represent the hexadecimal number hh. For example, X'F00' is the same as the number &HF0 in the BASIC programming language, which is the same as the decimal number 240.

Figure 1:
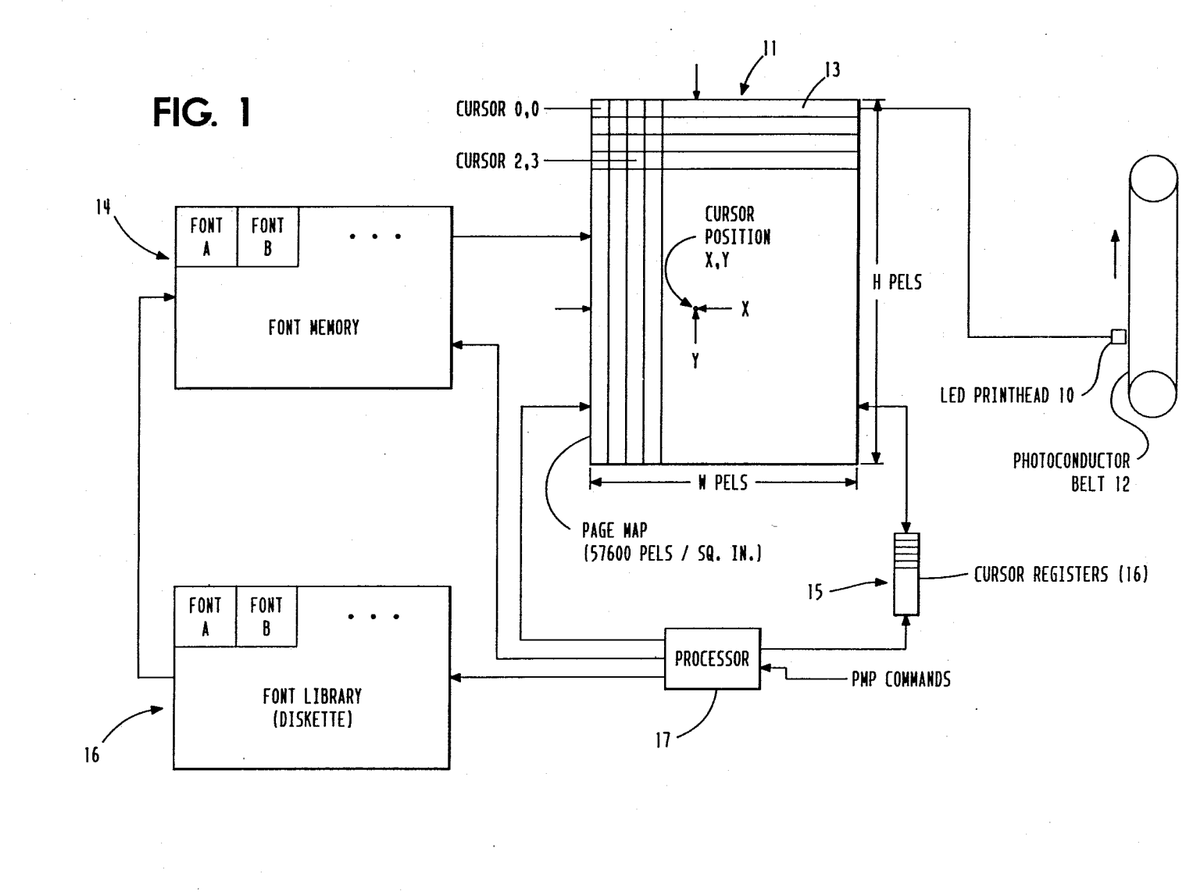
FIG. 1 is a schematic showing of a printer embodying the present invention.

The printer is controlled by a microprocessor 17 of FIG. 1. The microprocessor interprets existing host data streams from which it receives either an EBCDIC data stream or an ASCII data stream. In order to receive a PMP data stream, an escape from this existing data stream must be performed. This is done using the ASCII "escape" character, followed by the character "[", followed by the character "C" (i.e., X'1B' X'5B' X'43'); or by use of the EBCDIC "escape" character followed by X'CA'. The bytes of data which follow these escape sequences (two bytes for ASCII, and one byte for EBCDIC) tell the processor how many bytes of PMP commands follow the escape sequence. The processor remains in the PMP state until the specified number of bytes have been read. If an escape into PMP is not initiated, the microprocessor will transform existing ASCII or EBCDIC data stream controls directly into PMP within the printer.

The following example writes a BASIC program file "PMP.OUT" to disk, the program generating an escape sequence (line 40), and then indicating that "N" bytes of PMP command follow the escape sequence (line 50).

30 OPEN "PMP.OUT" FOR OUTPUT AS #2
40 PRINT #2,CHR$(&H1B);"[C";
50 PRINT #2,CHR$(N)

The description that follows does not repeat the need for an escape sequence prior to PMP commands. Only the PMP command parameters are described. In this description the title of the command is first given. This is followed by the hexadecimal form of the command. A general description of the PMP command is then given. In most cases, a BASIC program example of the use of the command is also given.

PAGE COMMANDS

The following PMP commands deal directly with characteristics of the printed page. These commands set overall page parameters.
 Set Page Size
 Set Page Orientation
 Print Page
 Set Page Size:
 byte
  0: X'F6'
  1: ww
  2: ww
  3: hh
  4: hh In order for the printer to correctly align the page map with the paper, this PMP command identifies what size paper will be used. This command also clears the page map of any image data it may contain at the time the command is issued.

The two byte field "wwww" (here represented in hexadecimal) is a 16-bit unsigned binary number that defines the paper width in PELS.

The two byte field "hhhh" is a 16-bit binary number that defines the paper height in PELS.

The width and height describe the size of the paper irrespective of print orientation on the paper. That is, the width describes the horizontal dimension of the page for portrait printing, and the vertical dimension of the page for landscape printing.

If the width or height value is zero, the printer reads the size-sensing switches in the printer's paper supply cassette(s), and uses this reading to set the value of the missing dimension(s). When the printer is first turned on, the page size is set in the same way as if height and width values of zero had been specified. Since this command clears the page map, any image data then in the page map is lost. This command also sets the cursor registers (sixteen in number) to the new upper left hand corner of the page.

To set the page size to 7 by 10 inches, using BASIC:
PRINT #2,CHR$(&HF6);
PRINT #2,CHR$(INT((7*240)/256);
PRINT #2,CHR$((7*240) AND & HFF);
PRINT #2,CHR$(INT((10*240)/256);
PRINT #2,CHR$((10*240) AND & HFF);
Set Page Orientation:
byte
  0: X'D2'
  1: nn This PMP command controls which edge of the paper sheet will be treated as the top edge of the sheet, as information to be printed is generated. This command also determines which corner of the page is the upper left-hand corner, i.e., the 0,0 corner, using cursor position terminology.

The field "nn" controls page orientation. More specifically, "00" is portrait (i.e., FIG. 6A); "01" is landscape right (i.e., FIG. 6D); "02" is portrait upside-down (i.e., FIG. 6B); and "03" is landscape left (i.e., FIG. 6C).

Orientation of a character or symbol within a page can change at any time. Therefore, any part of a page can be printed with any orientation.

When orientation is changed, the cursor continues to point to the same PEL in page memory. The cursor's position components change as is necessary to maintain the cursor position. Likewise, cursor registers (with the exception of register "0" which always points to the page's 0,0 corner) continue to point to the PELS they pointed to before the orientation was changed.

Changing page orientation causes the active and alternate fonts to be rotated to match the new page orientation. At power turn on, the default page orientation is for portrait printing.

To set a page orientation of landscape left, using BASIC:
PRINT #2,CHR$(&HD2);CHR$(3);
Print Page:
Byte
  0: X'D1'
  1: options This command causes a page to be printed with options.

The byte field "options" is a bit mask, as follows:
bit 1: If this bit is "1", the page's image in the page map is saved after printing the page. By executing another "Print Page" command, another copy of the page map can be printed. Any number of copies of the page map can be printed as long as this bit is "1" in this command. If this bit is "0", the page map is cleared to all white or all black after printing the page. Which of these two is done depends on the option selected with the "Set Generation Mode" command.

bit 2: If this bit is "1", the printer uses paper from its alternate paper cassette. Otherwise, paper is taken from the primary cassette.

bits 3 through 8 are all "0"

To print two copies of a page, the first from the primary cassette, and the second from the alternate cassette:

PRINT #2,CHR$(&HD1);CHR$(&H80);
PRINT #2,CHR$(&HD1);CHR$(&H40);

CURSOR COMMANDS

The following PMP commands deal with the page map cursor.

Set Cursor Horizontally
Set Cursor Vertically
Move Cursor Horizontally
Move Cursor Vertically
Save Cursor
Restore Cursor
Restore Cursor Component Set Cursor Horizontally:
Byte
 0: X'E0'
 1: hh
 2: hh This command sets the horizontal position component of the page map cursor.

The two-byte field "hhhh" is the horizontal position of the cursor in PELS.

A value of 0 for this field indicates the left edge of the page. The left edge may be any of the four edges of the physical page, depending upon the current page orientation.

To set the cursor 1½ inches (i.e., 360 PELS) from the left edge of the page, using BASIC:

PRINT #2,CHR$(&he0);CHR$(INT(360/256));
PRINT #2,CHR$(360 AND &HFF)

Set Cursor Vertically:
byte
 0: X'E1'
 1: vv
 2: vv

This command sets the vertical component of the page map cursor.

The two-byte field "vvvv" is the vertical position of the cursor in PELS.

A value of "0" for this field indicates the top edge of the page. The top edge of the page may be any of the four physical edges of the page, depending upon the current page orientation.

To set the cursor ½ inch (120 PELS) down from the top edge of the page, using BASIC:

PRINT #,@,CHR$(&HE1);CHR$(0);CHR$(120);

Move Cursor Horizontally:
Byte
 0: X'E2'
 1: hh
 2: hh

This command moves the position of the page map cursor either to the right or to the left.

The two-byte field "hhhh" is the number of PELS to move the cursor to the right or to the left. It is a plus or a minus number.

This command adds "hhhh" to the horizontal component of the current cursor position. Negative numbers move the cursor to the left. Positive numbers move the cursor to the right.

To move the cursor ¼ inch (60 PELS) to the right, using BASIC:

PRINT #2,CHR$(&HE2);CHR$(0);CHR$(60);

Move Cursor Vertically:
Byte
 0: X'E3'
 1: vv
 2: vv

This command moves the position of the page map cursor either up or down.

The two-byte field "vvvv" is the number of PELS to move the cursor up or down.

This command adds "vvvv" to the vertical component of the current cursor position.

Negative numbers move the cursor up. Positive numbers move the cursor down.

To move the cursor up ½ inch (120 PELS), using BASIC:

PRINT #2,CHR$(&HE2);
PRINT #2,CHR$(INT((−120/256) and &HFF));
PRINT #2,CHR$((−120) and & HFF)

Save Cursor:
Byte 0: X'8x'

This command saves the current cursor position in one of the cursor registers, i.e., registers 1 through 15.

The cursor's position can be saved in one of the 15 cursor registers (the additional register, register 0, can only be read, not written). Saving a cursor position allows the cursor to be moved back to a specific position after the cursor had been moved.

The first hexadecimal digit of this command is always "8". The second digit is the cursor register number (1 through 15) in which the cursor position is to be saved. For example, X'84' refers to cursor register 4, and C'8B' refers to cursor register 11.

The position of the saved cursor remains the same no matter how often the orientation of the page is changed. However, if the page size is set (see "Page Size" command), then the position saved in the cursor registers is lost, since all cursor registers are set to the upper left-hand corner of the page (the 0,0 position) when the page size is set.

The command X'80' is ignored because cursor register 0 is a read only register that always points to the upper left-hand corner of the page in the current orientation.

To save the current cursor position in register 5, using BASIC:

PRINT #2,CHR$(&H85);

Restore Cursor:
Byte 0: X'9x'

This command changes the cursor position to the position that was saved in one of the cursor registers.

The first hexadecimal digit of this command is always 9. The second digit is the cursor register number (0 through 15) which contains the position to which the cursor is to be restored. For example, X'90' refers to cursor register 0, and X'9B' refers to cursor register 11. This command does not change the content of the cursor register. The register continues to point to the same location until a new location is loaded into the register.

Cursor register 0 always point to the upper left-hand corner (0,0) of the page in the current page orientation.

To move the cursor to the position saved in cursor register 7, using BASIC:
PRINT #2,CHR$(&H97);
Restore Cursor Component:
Byte
   0: X'E4'
   1: hv
   2: reg This command restores one of the components of the cursor from a register, while leaving the other component unchanged.

The operand "hv" specifies which component is to be restored. A "0" restores the horizontal component, leaving the vertical component in the same PEL row. A "1" restores the vertical component, leaving the horizontal component in the same PEL column.

The operand "reg" specifies which cursor register (0 through 15) the component should be taken from.

To restore the vertical component of the cursor from register 6, using BASIC:
PRINT #2,CHR$(&HE4);CHR$(1);CHR$(6);

FONT COMMANDS

The following PMP commands deal with identifying which font(s) shall be usable, or no longer usable, in the loading of the page map. These commands manage fonts within the printer.

Activate Font
   Activate Alternate Font
   Deactivate Font
   Load Font Pattern
   Load Large Font Pattern
   Copy Font
   Copy Font Pattern
   Unload Font
   Unload All Fonts Activate Font:
Byte
   0: X'D3'
   1: nn This command is used for two purposes. If no character patterns have been previously loaded into the font memory number being activated, it prepares that numbered memory location for loading. If font patterns had been previously loaded into that font number location, this command makes those patterns available for immediate generation into the page map.

The field "nn" is the number of the font to activate in font memory. To activate a font is merely to make the font available for printing. Activating a font does not load it into working font memory storage. To load font patterns into working storage the first time after activating a font number, two choices are available. The font patterns can be loaded off of the diskette, or the patterns can be directly downloaded from a data stream. The commands "Load Font Pattern" and "Load Large Font Pattern" are used for this later function.

Once the font patterns have been loaded into font memory storage, they need not be loaded again. To print with them (i.e., to generate them into the page map), it is necessary to merely activate the font number of the font that was loaded, and then generate font patterns from that font.

The following PMP commands require an active font:
   Load Font Pattern
   Load Large Font Pattern
   Copy Font Pattern
   Generate Font Patterns When a font is activated, the font is automatically rotated to match the current page orientation.

To activate font 34, using BASIC:
PRINT #2,CHR$(&HD3);CHR$(35);
Activate Alternate Font:
Byte
   0: X'D7'
   1: nn This command activates the font numbered "nn" as the alternate font. An alternate font need not be activated. If one is used, its function is to backup the active font. If the active font is missing a font pattern, then the microprocessor will take that pattern from the alternate font.

The field "nn" is the number of the font within font memory which is to be activated as the alternate font.

When a given numbered font pattern is generated into the page map, the pattern is first sought in the active font. If it is not there (or if there is not active font designated), then an attempt is made to generate the pattern from the alternate font.

The alternate font can be used in the same way as the active font, and the same rules apply. While an alternate font need not be designated, it is useful in certain cases. For example, when a certain group of character patterns are the same in all of the fonts of a set of fonts, that group of characters can be loaded into a font which is designated as the alternate font, and that group of character patterns need not be loaded into the fonts of the set of fonts.

To activate font 22 as the alternate font, using BASIC:
PRINT #2, CHR$(&HD7); CHR$(22);
Deactivate Font:
Byte 0: X'C2'

This command deactivates the currently active font and the alternate font.

This command is used right before a "Set Page Orientation" command, if the currently active font is not to be used in the new orientation.

In this case, it is not necessary that the currently active font be rotated to match the new page orientation.

To deactivate a font, using BASIC;
PRINT #2, CHR$(&HC2);
Load Font Pattern:
Byte
   0: X'F0'
   1: nn
   2: hh
   3: ww
   4: L/T
   5: R/B
   6: offset
   Bytes 7 to n: pattern data This PMP command loads a specified character or symbol pattern into the active font.

The field "nn" is the number that the character (i.e. pattern) is to have in the active font.

The field "hh" is the height of the pattern box in PELS. The field "ww" is the width of the pattern box in PELS.

The field "L/T" is the character's left/top space in PELS; the field "R/B" is the character's right/bottom space in PELS; and the field "offset" is the character's cursor line offset in PELS.

The multiple-byte field "pattern data" is a series of bytes that contain the image data to be placed into the character's pattern box, one bit per PEL. These bits are sent by row, top row first. There are "hh" rows, each row containing "ww" PELS. A byte cannot be divided between two rows. A new row of PELS must always begin with a new byte. If the number of PELS on a row does not correspond to an integral number of bytes (for instance, if the width of the pattern box is 27 PELS), the unused bits in the last byte of each row are set to zeros.

If no font has been activated, this command is ignored.

To load the pattern number shown in FIG. 2 into pattern number 25 of the active font, using BASIC:
PRINT #2, CHR$(&HF0); CHR$(25);
'Height and Width
PRINT #2, CHR$(6); CHR$(4);
'Cursor positioning
PRINT #2, CHR$(1); CHR$(2); CHR$(4);
'Pel data
PRINT #2, CHR$(&H70); CHR$(&H90);
PRINT #2, CHR$(&H90); CHR$(&H70);
PRINT #2, CHR$(&H10); CHR$(&H60);
Load Large Font Pattern:
Byte
   0: X'F4'
   1: X'00'
   2: nn
   3: hh
   4: hh
   5: ww
   6: ww
   7: L/T
   8: L/T
   9: R/B
   10: R/B
Bytes 11 and 12: offset
Bytes 13, 14 and 15: length
Bytes 16 to n pattern: data This command loads a large character or symbol pattern into the active font.

The field "nn" is the number the pattern will be assigned in the active font.

The two-byte field "nnnn" is the pattern's height in PELS. The two-byte field "wwww" is the pattern's width in PELS.

The two-byte field "L/T, L/T" is the character's left/top space in PELS; the two-byte field "R/B, R/B" is the character's right/bottom apace in PELS; and the two-byte field "offset" is the character's cursor line offset in PELS.

The three-byte field "length" is the number of bytes of character pattern data that follows in bytes 16 through n. If the number of bytes specified is too many for the size of the specified pattern box, the unused bytes are skipped. If the number of bytes is too few to fill the pattern box, the remainder of the pattern box is filled with zeros.

The multiple-byte field "pattern data" is the series of bytes that contain the character's pattern box data, organized by row, like in the "Load Font Pattern" command. This command is like the "Load Font Pattern" command in its effect. Its differences relate to the larger size of patterns that can be loaded with this command.
Copy Font:
Byte
   0: X'E5'
   1: to
   2: from This PMP command copies one font memory loaded font to another font location within the font memory.

The field "to" is the number of the font to which font patterns are copied. The field "from" is the number of the font from which the font patterns are copied. The "from" font totally replaces the "to" font in font memory. If there were any patterns already in the "to" font, they are replaced.

To copy the patterns in font 75 to font 101, using BASIC:
PRINT #2, CHR$(&HE5);
PRINT #2, CHR$(101); CHR$(75);
Copy Font Pattern:
Byte
   0: X'FA'
   1: to#
   2: nn
   3: from#

This command copies a single pattern from a specified font into the active font.

The byte field "to#" is the number of the pattern location within the active font where the pattern that is being copied will be loaded. The field "nn" is the number of the font from which the pattern is copied. The field "from#" is the number of the pattern character in font "nn" that is to be copied.

This operation overwrites a pattern already present in the active font, if one is present at the "to#" location.

To copy pattern 71 from font 22 to pattern 63 in the active font, using BASIC:
PRINT #2, CHR$(&HFA); CHR$(63);
PRINT #2, CHR$(22); CHR$(71);
Unload Font:
Byte
   0: X'D4'
   1: nn This command clears a font from working font memory storage.

The field "nn" is the number of the font to be cleared from working storage. The font is cleared from storage even when the specified font is the currently active or alternate font.

To clear font number 17 from working storage, using BASIC:
PRINT #2, CHR$(&HD4); CHR$(17);
Unload All Fonts:
Byte 0: X'C7'

This command removes all fonts from font memory working storage, and deactivates the active and alternate fonts.

Before loading any fonts, it is desirable to begin with an "Unload All Font" command. When the printer is first powered on, certain fonts are automatically loaded into font memory, and these fonts may take up almost all of the storage space in font memory. The "Unload All Fonts" command is a way to release memory space for the loading of other fonts.

To send this command, using BASIC:
PRINT #2, CHR$(&HC7);

GENERATION COMMANDS

The following PMP commands deal with how character data patterns are loaded or generated into the page map.
Set Generation Mode Set Font Pattern Controls
Generate Font Patterns
Generate Pattern immediate
Generate vectors
Generate vectors—Close and Fill
Set Generation Mode:
Byte
  0: X'D9'
  1: mode This command selects how pattern data bits are generated into page map PELS. The binary "0" bits are called the background bits. The "1" bits are called the foreground bits.

The field "mode" is an 8-bit mask having the following meaning:
  bits 1 and 2: "back"
  bits 3 and 4: "fore"
  bits 4 through 7 are all: "0"

The two "back" bits contain background control information. The setting of these two bits controls the state of a PEL in the page map as caused by a "0" data bit. When the "back" bit pattern is "00", the PEL is white; when it is "01", the PEL is black; when it is "10", the PEL is unchanged (this is the power-on state of these two bits); and when it is "11", the PEL state is flipped, i.e., if it is currently white, it becomes black, and if it is currently black, it becomes white.

A "Print Page" command, with "clear the page map" as an option, sets all of the PELS to white unless "black" in this command is "01". When "black" is "01", a "Print Page" command with "clear the page map" as an option, sets all of the PELS to black.

The two "fore" bits contain foreground control information. The setting of these two bits controls the state of a PEL in the page map as caused by a "1" data bit, or when a vector passes through the page map bit cell. When the "fore" bit pattern is "00" the PEL is white; when it is "01", the PEL is black (this is the power-on state of these two bits); when it is "10", the PEL is unchanged; and when it is "11", the PEL is flipped, i.e., if it is currently black, it becomes white, and if it is currently white, it becomes black.

Normally, the fonts are such that the pattern data bits "1" are designated to print black. However, unless the generation mode is changed with this command, the "0" bits do not force the PELS to be white. If they did, and two characters were generated in the same place in the page map, only the last one would be actually printed. By having the "0" bits leave the page map unchanged, when characters overlap, they both print, just as with a typewritter.

The effect of the "1" and "0" character data pattern bits can be reversed, for example, to have white characters on a black background. The recommended technique is to first set the entire background to black, and then generate patterns with the generation mode set so that the "1" bits produce white PELS, and the "0" bits leave the PELS unchanged.

To set up normal black-on-white printing, where the "0" bits are ignored so that any previously black PELS in the page map are overlaid (instead of replaced), using BASIC:
  PRINT #2, CHR$(&HD9); CHR$(&H90);
Set Font Pattern Controls:
Byte
  0: X'D8'
  1: mm This command sets up options for the command "Generate Font Patterns".

The field "mm" is an 8-bit mask, having the following meaning.
  bits 0 and 1: "dir"
  bit 2: "ce"
  bit 3: "mo"
  bits 4 through 7 are all: "0"

The two "dir" bits control the direction of printing. When "dir" is "00", the printing is left to right (direction 40, FIGS. 7A through 7D); when it is "01", printing is right to left (direction 41, FIGS. 7A through 7D); when it is "10", printing is top to bottom (direction 42, FIGS. 7A through 7D); and when it is "11", printing is bottom to top (direction 43, FIGS. 7A through 7D).

The "ce" bit controls the position of the cursor relative a character box. If this bit is "1", the cursor line goes through the center of the pattern box. If this bit is "0", the cursor line is determined by the normal method of using the cursor (CL) offset parameter. This option can be used, for example, when printing the word "Y-Axis" top to bottom to label a graph. The characters will look better when they are centered above the other.

The "mo" bit controls modified spacing. If this bit is "1", the "Generate Font Patterns" command adds a value to the cursor position after normal spacing. Reverse direction (right to left or bottom to top) subtracts the value from the cursor position before printing from the cursor position, and before printing the pattern instead of after. This command is used to alter the spacing of font patterns from the values that the L/T space and the R/B space define, for example, to do precise text justification.

To specify these parameters as top to bottom printing, center alignment, and modified spacing:
  PRINT #2, CHR$(&HD8); CHR$(&HB0);
Generate Font Patterns:
  Byte 0: 0xxxxxxx
  Bytes 1 through n: pattern numbers This command generates a pattern or patterns from the active font into the page map. This is the PMP command used for generating text.

The most significant bit of the first byte of this command is always "0". The first bit of all other PMP commands have this bit as a "1".

In the first byte, the "xxxxxxx" field is the number of bytes that follow in the "pattern numbers" field.

The "pattern numbers" field are the numbers of the patterns to be generated from the active font. As each pattern is generated in order, the cursor is moved within the page memory, based upon the cursor positioning parameters (L/T and R/B) of the pattern. In normal spacing mode, a pattern number is one byte. In modified spacing mode, each pattern number is a pair of bytes. The first byte is the pattern number. The second byte is the spacing modification value, which value is applied to modify the cursor position in the page map.

If a selected pattern number is not loaded in the active font, an attempt will be made to generate the pattern from the alternate font. If the pattern is not loaded in the alternate font, an attempt will be made to generate pattern number 0 from the alternate font. If none of these attempts yields a valid pattern (for example, if no font is currently active or alternate), a special error character (a 16 by 16 PEL checkerboard) will be generated into the page map at the current cursor position.

To generate the characters "ABC" from the active font starting at the current cursor position, using BASIC:

PRINT #2, CHR$(3); "ABC";

Generate Pattern Immediate:
Byte
  0: X'F5'
  1: X'00'
  2: hh
  3: hh
  4: ww
  5: ww
Bytes 6, 7 and 8: length
Bytes 9 through n: pattern data This command places a bit pattern directly into the page map at the current cursor position. This is the command used to generate bit-image graphics.

The two-byte field "hhhh" is the height of the pattern in PELS. The two-byte field "wwww" is the width of the pattern in PELS.

The three-byte field "length" is the number of bytes of "pattern data" which is to follow. If the number of bytes is too few to fill the pattern rectangle, the remainder are left blank. If the number of bytes is greater than the number of bytes in the rectangle, the extra bytes are ignored.

The field "pattern data" is a series of bytes that contain the image data that the printer will generate onto the page, one bit per PEL. The bits are sent by row, top row first. There are "hhhh" rows, each row having "wwww" PELS. A byte cannot be divided between two rows. A new row of PELS must begin with a new byte. If the number of PELS on a row does not correspond to an integral number of bytes (for example, if the width of an image pattern is 12 PELS), the unused bits in the last byte of every row are set to zero.

Bits in the pattern data set PELS in the page map based upon the generation mode then in effect, as set by the Set Generation Mode command. The image pattern is aligned so that its upper left-hand corner is at the page map's current cursor position. The cursor position is not changed by this command.

Just as with font patterns, the data is rotated automatically to match the orientation of the page.

Generate Vectors:
Byte 0: X'F8'
Bytes 1 and 2: length
Bytes 3 through n: vectors This command generates vectors in the page map by drawing lines between successive points, starting with the current cursor position.

The two-byte field "length" is the number of bytes to follow the field. The field "vectors" is a variable length byte field wherein the bytes specify the subsequent vector points. The first byte of the "vectors" field is a control byte. This byte is a bit mask that describes how the remaining bytes of the "vectors" field should be interpreted. This bit mask has the following meaning.

bits 0 and 1: mode
  bit 2: re
  bits 3 through 7: thickness

The two bits "mode" describes the vector. The two bits being "00", identify the "register" mode. In this mode, vector end points are coded as the positions saved in cursor registers. Each register is coded as a number from 0 to 15 in a byte. The two bits being "01" identifies the nibble mode. In this mode, one vector end point is coded per byte. Each of these bytes contains two vector displacements. Vertical displacement is in the first four bits, and horizontal displacement is in the last four bits. The two bits being "10" identify the byte mode. In this mode, each vector end point is coded with two one-byte displacements. Vertical displacement is in the first byte, and horizontal displacement is in the second byte. The two bits being "11" identify the double-byte mode. In this mode, each vector end point is coded with two two-byte displacements. The vertical displacement is in the first two bytes, and the horizontal displacement is in the last two bytes.

The field "re" relates to round vector ends, and specifies whether the ends of the vectors will be round or square. If the bit is "1", they are round. The square-end mode is preferred for drawing boxes, and round ends are preferred when vectors meet at arbitrary angles.

Figure 3:
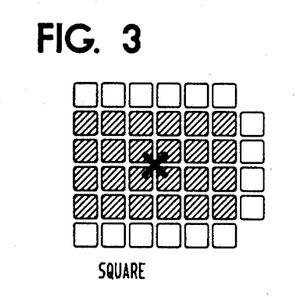
FIGS. 3 and 4 show the ends of vector lines which are formed with square and round ends, respectively.
Figure 4:
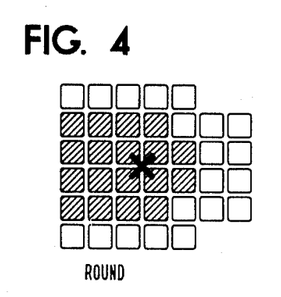

Examples of the PEL patterns of square and round endings are shown in FIGS. 3 and 4, respectively.

The five-bit field "thickness" specifies the thickness of the vector in PELS. The vectors of FIGS. 3 and 4 have a thickness of four PELS. If the thickness of the vector is greater than one PEL, the vector is centered with the end of the vector on the cursor.

The first vector connects the current cursor position with the first end point, and the cursor position then moves to the next end point. The next vector repeats this process with the next end point.

In the "nibble", "byte" and "double-byte" modes, if a vector operand indicates that both the horizontal and vertical displacements are "0", the next byte is read as a new control byte. Whenever line width or mode is to be changed, without executing a new PMP command, this feature can be used.

Generate Vectors—Close and Fill:
Byte
  0: X'F9'
  1: font
  2: pattern
  3: reg
Bytes 4 and 5: length
Bytes 6 through n: vectors This command creates a closed polygon that is filled after drawing the vectors.

The field "font" is the font number of the fill pattern that will be used to fill the polygon.

The field "pattern" is the number of the pattern within the font that will be used for fill.

The field "reg" is the number of the cursor register that contains a reference point for the fill pattern. Fill patterns are generated to be an integral number of pattern widths and heights from this reference point. Therefore, exact alignment of the pattern can be controlled. The "reg" point can be cursor register "0" if desired.

Figure 5:
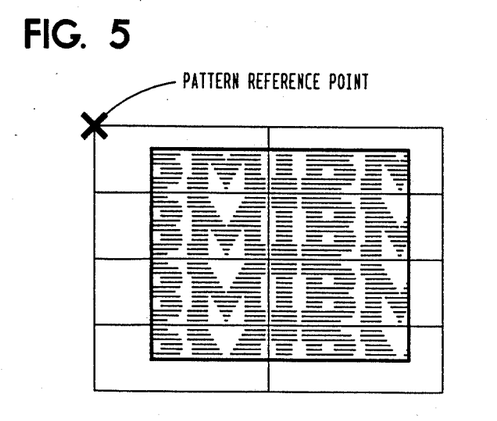
FIG. 5 shows a box created by vector lines, the box being filled with a selected character image.

Vectors are created by drawing lines between end points, starting with the current cursor position. The vectors are closed by connecting the first and last end points. The closed area is then filled with a character pattern. If the first and last end points do not meet, an invisible vector is created between the two end points, and the polygon is filled. The spacing values of the fill pattern (i.e., L/T, R/B and offset) are ignored, and the patterns are densely packed. FIG. 5 is an example.

While the invention has been particularly shown and described with reference to a preferred embodiment, it will be understood by those skilled in the art that various changes in form and details may be made without departing from the spirit and scope of the invention.

What is claimed is:

1. A method of printing on a sheet having top, bottom, left and right edges, and having a right edge to left edge width dimension (W), and a top edge to bottom edge height dimension (H), the sheet containing W-times-H individually printable areas (PELS) which may be either printed in a color or left uncolored, using an all-pels-addressable (APA) printer, and the printer feeding the sheet through a print station with the sheet's top edge as the leading edge, comprising:

providing a page memory having at least W-times-H PEL memory locations, and a cursor which is movable within said page memory, the cursor's position being identified by W and H dimensions within said page memory, and the cursor's position identifying an individual PEL area on said sheet and a corresponding PEL memory location is said page memory, the binary number content of said page memory location determining whether the corresponding sheet PEL area will be colored or left uncolored;

providing a source of print fonts, each font having a unique font identifying number, and each font comprising a plurality of characters, each character being defined by h parallel raster scan lines, each raster scan line being w PELs long, and each individual PEL containing a binary bit, the multiplicity of binary bits in the multiplicity of raster lines defining the character, the character also having
(a) a unique character identifying number,
(b) a rectangular character box of h-times-w PEL areas, said character box having h raster scan lines, each of w-PEL length, and containing within said character box the binary content of the raster scan lines defining the character's image,
(c) an L/T number defining the number of PELS which exist between the left edge of its character box and the location of the starting cursor position for the character,
(d) and R/B number defining the number of PELS which exist between the right edge of its character box and the location of the ending cursor position for the character, and
(e) a cursor line (CL) offset number defining the number of PELS which exist between the top edge of its character box and the location of a cursor line which connects the character's staring cursor position and its ending cursor position, composing a page to be printed by defining a font whose characters may be loaded into page memory to compose a page image, loading selected characters from said font into said page memory in accordance with the character's L/T, R/B and CL numbers, whereupon each ending cursor position for a character becomes the starting cursor position for the next character, and the cursor lines of all characters are aligned to define scan lines within said page memory; and scanning the memory locations of said page memory, while applying the resulting binary content of each of said memory locations to said print station, as said printer prints corresponding PEL areas of said sheet.

2. The method of claim 1 including the initial step of determining the physical size of the sheet to be printed, and defining a corresponding memory size in said page memory into which the PEL image of the sheet will be loaded.

3. The method of claim 1 wherein said character box contains binary data which defines a character as a pattern of colored PELS on an uncolored background, and including the step of selectively loading characters into said page memory in an inverted fashion, such that said loaded character is an uncolored character pattern on a colored background.

4. The method of claim 1 wherein a binary "1" within a PEL area of said character box identifies one state of printing coloration of said PEL area, and a binary "0" within a PEL area of said character identifies the opposite state of printing coloration of said area, and including the step of selectively inverting the coloration meaning of the binary numbers within the PEL areas of said character box.

5. The method of claim 1 including the steps of:
selecting one of four possible print directions whereby said printer will print the PEL content of said page memory onto said sheet, the four directions comprising a first pair of collinear directions (a) and (b) and a second pair of collinear directions (c) and (d), wherein said directions comprise:
(a) across the width W of the sheet, left to right,
(b) across the width W of the sheet, right to left,
(c) down the height H of the sheet, and
(d) up the height H of the sheet,
wherein said fonts are configured to support one of said pair of collinear directions,
providing a font memory and loading at least one font into said font memory, and
sensing which of said print directions has been selected, and redefining said L/T, R/B and cursor line offset numbers to support said required print direction when said selected print direction is not within said supported pair of directions.

6. The method of claim 5 including the steps of defining a location within said page memory for said cursor, and thereafter loading characters into said page memory based upon said cursor location.

7. The method of claim 6 including the steps of providing a cursor register, and saving a first location of the page map cursor in said register prior to moving said cursor to a different location, such that said cursor may be subsequently restored to said first page map location.

8. The method of claim 2 including the steps of defining an active font and an alternate font as being usable to form said page image, and using a said selected character from said active font, but selecting a similarly numbered character from said alternate font in the event said selected character is not contained in said active font.

9. The method of claim 8 including the steps of unloading fonts from said font memory, and loading other fonts into said font memory in accordance with the page image requirements of the page being composed.

10. The method of claim 1 including the steps of:
selecting one of four possible page orientations whereby said printer will print the PEL content of said page memory onto said sheet, the four orientations being:
(a) portrait, wherein the sheet's top edge is the top of the image to be printed,
(b) portrait upside-down, wherein the sheet's bottom edge is the top of the image to be printed,
(c) landscape left, wherein the sheet's left edge is the top of the image to be printed, and (d) landscape right, wherein the sheet's right edge is the top of the image to be printed, indicating which of said fonts shall be an active font, providing a font memory and loading at least said active font into said font memory, selecting a character from a font in said font memory as a character to be loaded into said page memory, and sensing which of said four orientations has been selected, and rotating said active font in said font memory corresponding to said selected orientation, and loading said selected character from said font memory into said page memory in an orientation in accordance with the selected orientation.

11. The method of claim 10 including the steps of defining a location within said page memory for said cursor, and thereafter loading characters into said page memory based upon said cursor location.

12. The method of claim 11 including the steps of providing a cursor register, and saving a first location of the page map cursor in said register prior to moving said cursor to a different location, such that said cursor may be subsequently restored to said first page map location.

13. The method of claim 10 including the steps of defining an alternate font as being usable to form said page image, rotating said alternate font in said font memory corresponding to said selected orientation, and using a said selected character from said active font, but selecting a similarly numbered character from said alternate font in the event said selected character is not contained in said active font.

14. The method of claim 13 including the steps of unloading fonts from said font memory, and loading other fonts into said font memory in accordance with the page image requirements of the page being composed.

* * * * *